United States Patent [19]
Cerny

[11] 3,978,504
[45] Aug. 31, 1976

[54] PHOTOGRAPHIC SUPERIMPOSITION DEVICE

[75] Inventor: Otto G. Cerny, Chicago, Ill.

[73] Assignee: The Raymond Lee Organization, Inc., New York, N.Y. ; a part interest

[22] Filed: Dec. 16, 1974

[21] Appl. No.: 532,992

[52] U.S. Cl. .............................. 354/285; 352/87; 355/76
[51] Int. Cl.² .......................................... G03B 17/26
[58] Field of Search .................. 352/46, 50, 52, 85, 352/87; 354/285; 355/72, 76

[56] References Cited
UNITED STATES PATENTS

| | | | |
|---|---|---|---|
| 280,166 | 6/1883 | Flammang | 354/285 |
| 2,998,313 | 8/1961 | Maurer | 352/87 |
| 3,463,586 | 8/1969 | Carlson | 355/76 |

Primary Examiner—Monroe H. Hayes
Attorney, Agent, or Firm—Daniel Jay Tick

[57] ABSTRACT

A photographic superimpositon device for maintaining photographic film in superimposed mutual position comprises a film holder having a rectangular frame having a first pair of spaced parallel members and a second pair of spaced parallel members perpendicular to the first pair of members and affixed thereto to form a rectangle. Each member of the first pair of members and one member of the second pair of members has slots formed therein on the inside of the rectangle for accommodating shutters in the frame in spaced parallel relation. A planar opaque partition is provided in the frame between the slots formed therein and shutters therein and is spaced from shutters in the slots. A plurality of pins in the partition extend from both sides thereof perpendicularly thereto for maintaining film in position in the spaces between the partition and shutters in the slots.

2 Claims, 4 Drawing Figures

PHOTOGRAPHIC SUPERIMPOSITION DEVICE

DESCRIPTION OF THE INVENTION:

The present invention relates to a photographic superimposition device. More particularly, the invention relates to a photographic superimposition device for maintaining photographic film in superimposed mutual position.

Objects of the invention are to provide a photographic superimposition device of simple structure, which is inexpensive in manufacture and which maintains photographic film in superimposed mutual position efficiently, effectively and reliably, with facility and convenience, and eliminates the need for stripping and double printing, and the disadvantages of loss of quality, loss of time, cost of retouching, inaccuracy, and other disadvantages inherent in stripping and double printing.

In order that the invention may be readily carried into effect, it will now be described with reference to the accompanying drawing, wherein.

In the FIGS., the same components are identified by the same reference numerals.

The photographic superimposition device of the invention is for maintaining photographic film in superimposed mutual position.

Figure 1:
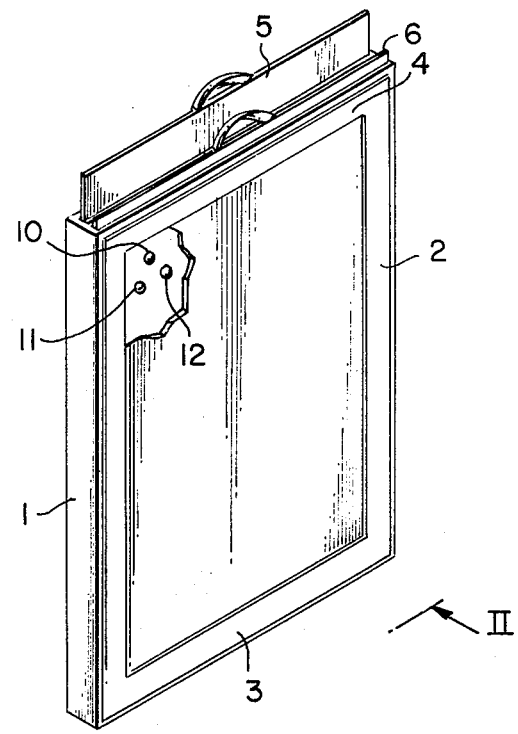
FIG. 1 is a partly cut away schematic diagram of an embodiment of the photographic superimposition device of the invention.
Figure 2:
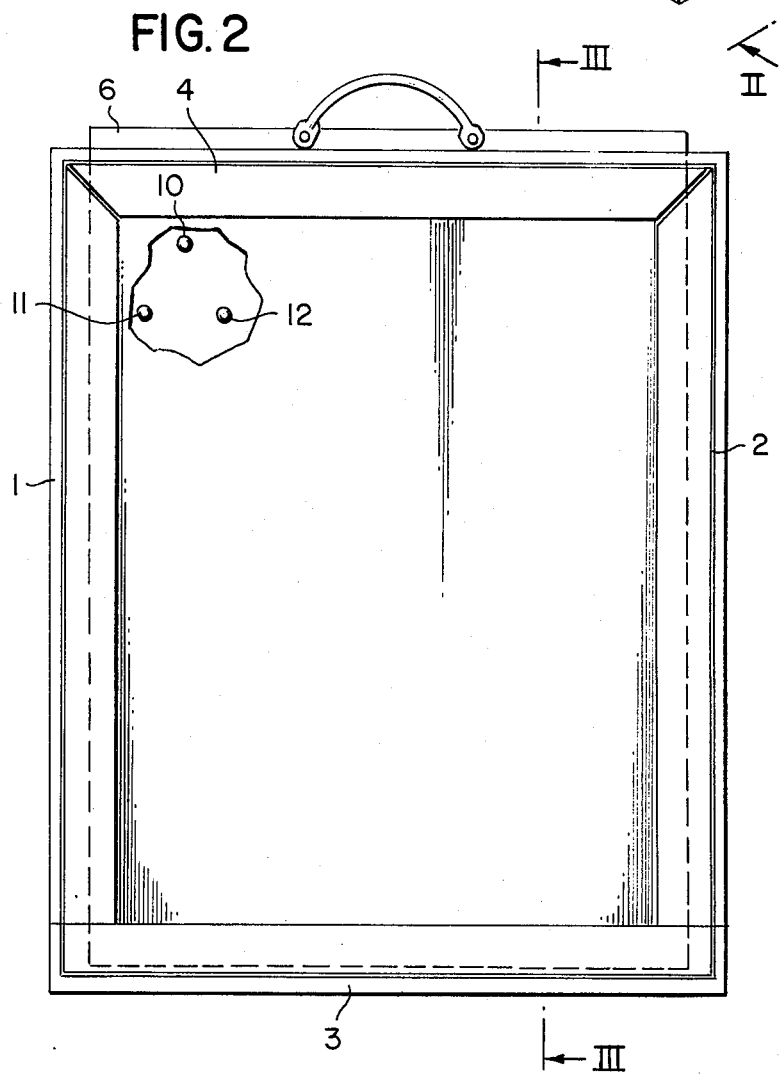
FIG. 2 is a view, taken along the lines II—II, of FIG. 1.
Figure 3:
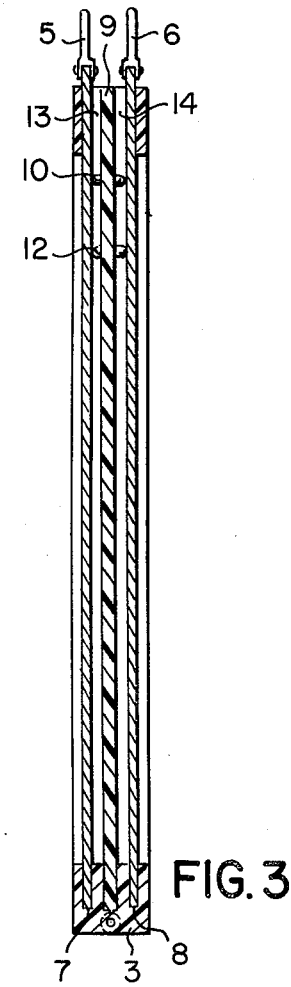
FIG. 3 is a cross-sectional view, taken along the lines III—III, of FIG. 2.

The photographic superimposition device of the invention comprises a film holder having a substantially rectangular frame having a first pair of spaced substantially parallel members 1 and 2 and a second pair of spaced substantially parallel members 3 and 4 substantially perpendicular to the first pair of members and affixed thereto to form a substantial rectangle, as shown in FIGS. 1 and 2. Each member 1 and 2 of the first pair of members and one member 3 of the second pair of members has slots formed therein on the inside of the rectangle for accommodating shutters 5 and 6 in the frame in spaced parallel relation. Thus, as shown in FIG. 3, the member 3 has a pair of slots 7 and 8 formed therein for accommodating the shutters 5 and 6, respectively. The slots formed in the members 1 and 2 are coplanarly aligned with the slots 7 and 8.

A substantially planar opaque partition 9 (FIG. 3) is provided in the frame 1, 2, 3, 4 between the slots 7, and so on, and 8, and so on, formed therein and the shutters 5 and 6 in said slots. The partition 9 is spaced from the shutters 5 and 6 in the slots.

A plurality of pins 10, 11 and 12 (FIGS. 1 and 2) are provided in the partition 9 and extend from both sides thereof substantially perpendicularly thereto for maintaining film in position in the spaces 13 and 14 between the partition and the shutters 5 and 6 in the slots (FIG. 3).

Figure 4:
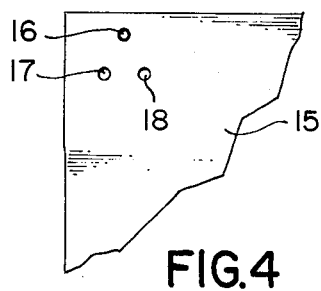
FIG. 4 is a view of part of a photographic film supported by the device of the invention.

Photographic film 15 (FIG. 4) has holes 16, 17 and 18 formed therethrough in correspondence with the positions of the pins 10, 11 and 12, respectively, for accommodating said pins.

One strip of film is maintained in position in the space 13 and another strip of film is maintained in the space 14.

In the illustrated embodiment, the pins 10, 11 and 12 are in spaced mutual relation at the apices of a triangle.

The photographic superimposition device of the invention is made functional by the following method, for example. An object is photographed against a black background. The background is then replaced with one which fluoresces under ultra violet radiation. A mask of the object is then photographed. The mask, overlaying the original photograph may then be used to superimpose the object to any desired background.

While the invention has been described by means of a specific example and in a specific embodiment, I do not wish to be limited thereto, for obvious modifications will occur to those skilled in the art without departing from the spirit and scope of the invention.

I claim:

1. A photographic superimposition device for maintaining photographic film in superimposed mutual position, said superimposition device comprising a film holder having a substantially rectangular frame having a first pair of spaced substantially parallel members and a second pair of spaced substantially parallel members substantially perpendicular to the first pair of members and affixed thereto to form a substantial rectangle, each member of the first pair of members and one member of the second pair of members having slots formed therein on the inside of the rectangle for accommodating shutters in the frame in spaced parallel relation;

a substantially planar opaque partition in the frame between the slots formed therein and shutters therein and spaced from shutters in the slots;

a plurality of rigid pins in the partition and extending from both sides thereof substantially perpendicularly thereto for maintaining film in position in the spaces between the partition and shutters in the slots; and photographic film having holes formed therethrough in correspondence with the positions of the pins for accommodating said pins whereby an object may be superimposed on any desired background on a single piece of film.

2. A photographic superimposition device as claimed in claim 1, wherein the pins comprise three pins in spaced mutual relation at the apices of a triangle.

* * * * *